United States Patent
Hirota (10) Patent No.: US 7,852,319 B2
(45) Date of Patent: Dec. 14, 2010

(54) INFORMATION PROCESSING APPARATUS AND OPERATION CONTROL METHOD

(75) Inventor: Toshiyuki Hirota, Hino (JP)

(73) Assignee: Kabushiki Kaisha Toshiba, Tokyo (JP)

(*) Notice: Subject to any disclaimer, the term of this patent is extended or adjusted under 35 U.S.C. 154(b) by 942 days.

(21) Appl. No.: 11/717,968

(22) Filed: Mar. 14, 2007

(65) Prior Publication Data

US 2007/0252823 A1 Nov. 1, 2007

(30) Foreign Application Priority Data

Apr. 26, 2006 (JP) .............................. 2006-122415

(51) Int. Cl.
*G06F 3/041* (2006.01)
(52) U.S. Cl. ..................... 345/158; 343/702; 345/169
(58) Field of Classification Search ......... 345/156–178; 343/702
See application file for complete search history.

(56) References Cited

U.S. PATENT DOCUMENTS

| 5,949,408 | A | * | 9/1999 | Kang et al. ................. 345/169 |
| 6,704,007 | B1 | * | 3/2004 | Clapper ....................... 345/204 |
| 6,901,274 | B2 | | 5/2005 | Idani et al. |
| 2003/0080906 | A1 | * | 5/2003 | Miyasaka ................... 343/702 |
| 2006/0240866 | A1 | * | 10/2006 | Eilts ........................ 455/556.1 |
| 2007/0037619 | A1 | * | 2/2007 | Matsunaga et al. ....... 455/575.7 |

FOREIGN PATENT DOCUMENTS

| JP | 11-143604 | 5/1999 |
| JP | 2000-010655 | 1/2000 |

* cited by examiner

*Primary Examiner*—Amare Mengistu
*Assistant Examiner*—Aaron Midkiff
(74) *Attorney, Agent, or Firm*—Blakely, Sokoloff, Taylor & Zafman LLP (57) ABSTRACT

According to one embodiment, an information processing apparatus includes a display unit. A display portion is provided in the display unit. An antenna is provided in the display unit and radiates radio waves. When the display unit is used in a usage pattern where the antenna is located in a side of the display unit which side is closest to a user, a controlling unit controls a direction of an image displayed on the display portion not to correspond to a direction of the display unit.

12 Claims, 8 Drawing Sheets

INFORMATION PROCESSING APPARATUS AND OPERATION CONTROL METHOD

CROSS-REFERENCE TO RELATED APPLICATIONS

This application is based upon and claims the benefit of priority from Japanese Patent Application No. 2006-122415, filed Apr. 26, 2006, the entire contents of which are incorporated herein by reference.

BACKGROUND

1. Field

One embodiment of the invention relates to an information processing apparatus including a display unit provided with an antenna for radiating radio waves, and to an operation control method of the information processing apparatus.

2. Description of the Related Art

Some information processing apparatuses, such as personal computers, are provided with an antenna in a display unit in order to perform wireless communication with other apparatuses. For example, U.S. Pat. No. 6,426,723 discloses a technique of providing a display unit with an antenna in a top portion and a side portion thereof.

In addition, recently, information processing apparatuses called "tablet PCs" are becoming widely used. In the tablet PCs, a display unit including a tablet in a display portion is rotatably attached to a main body via a hinge. Generally, in such an information processing apparatus, a tablet usage pattern called "tablet mode" is realized by folding the information processing apparatus such that a back surface of the display unit contacts a top surface of the main body, and a tablet is exposed to the outside.

Meanwhile, when a tablet PC including an antenna for irradiating radio waves is used, especially when the tablet PC is used in a tablet mode, in some cases, the antenna is located close to a user's body (abdomen, chest, etc.). In such cases, there is a possibility that an information processing apparatus does not satisfy standards established by a Japanese law related to radio waves. In Japan, the Ordinance Regulating Radio Equipment (an ordinance by the Ministry of Internal Affairs and Telecommunications) regulates the upper limit of the specific absorption rate (SAR), which is a physical value representing the level of energy of radio waves absorbed by a human body, and obliges us to observe the ordinance.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an information processing apparatus including: a display unit; a display portion provided in the display unit; an antenna provided in the display unit and radiating radio waves; and a controlling unit which includes a function of controlling, when the display unit is used in a usage pattern where the antenna is located in a side of the display unit which side is closest to a user, a direction of an image displayed on the display portion not to correspond to a direction of the display unit.

The invention can be realized in both a tablet input apparatus formed by a single housing in which a display unit serves as a main body, and in a computer device such as a tablet PC in which a display unit is rotatably attached to a main body.

Hereinafter, referring to the drawings, a description is given by taking as an example the computer device in which the display unit is rotatably attached to the main body.

Figure 1:
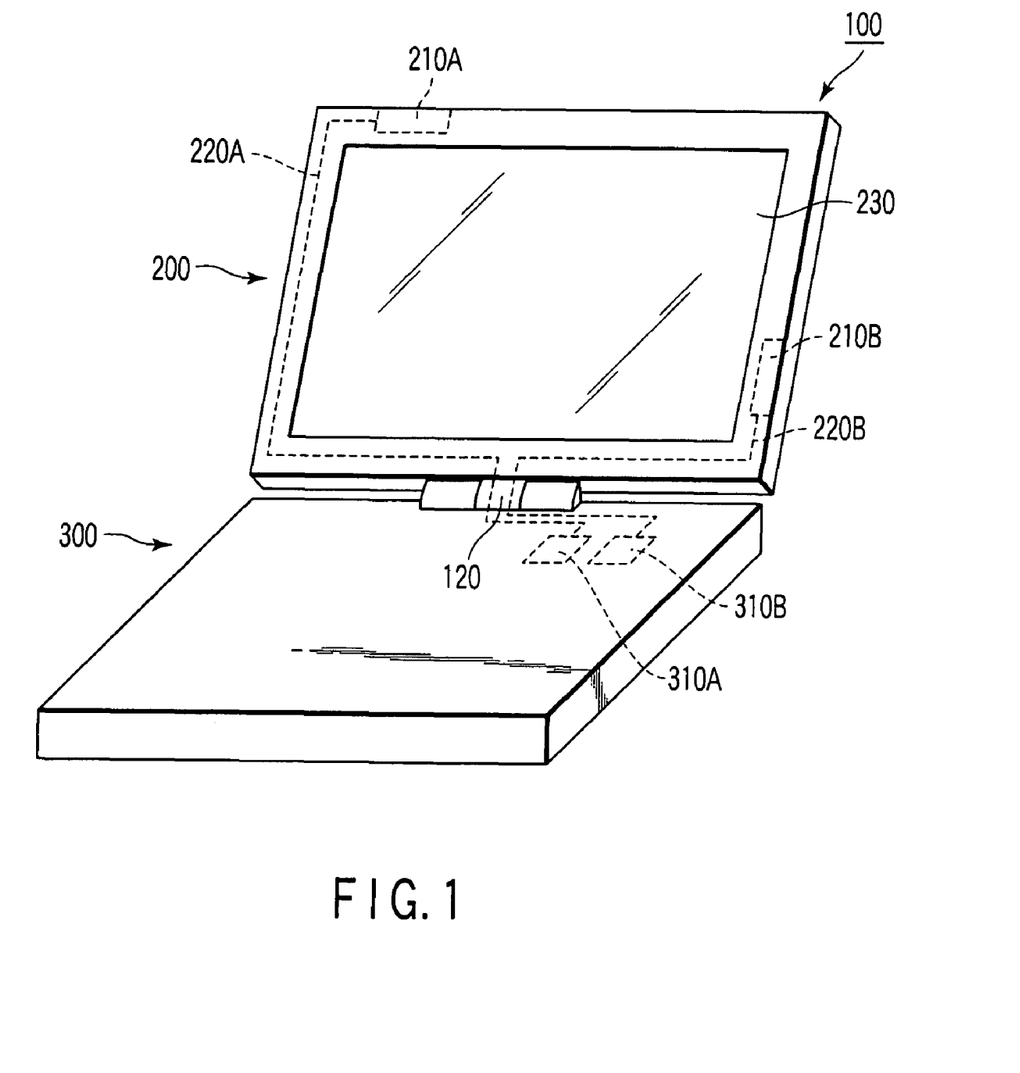
FIG. 1 is an exemplary perspective view showing an external appearance of an information processing apparatus according to a first embodiment or a second embodiment of the invention.

FIG. 1 shows an exemplary external structure of an information processing apparatus according to first and second embodiments.

The information processing apparatus shown in FIG. 1 is, for example, a personal computer 100 called "tablet PC". The tablet PC 100 includes a structure in which a display unit 200 including a tablet in a liquid crystal panel (display portion) 230 is rotatably attached to a main body 300 via a hinge 120. With such a structure, the display unit 200 can freely rotate on the hinge 120. For example, it is possible to close the tablet PC 100 such that the display unit 200 contacts the main body 300, and a display surface of the liquid crystal panel 230 faces outward. FIG. 1 shows a state (corresponding to a usage pattern called "laptop mode" or "normal mode") where the display unit 200 is opened from the main body 300, such that the display surface of the liquid crystal panel 230 faces toward a user.

Antennas 210A and 210B for wireless LAN are provided inside two adjacent sides of the display unit 200. These antennas 210A and 210B are provided at right angle with respect to each other, and capable of receiving different polarized electromagnetic radiations. In the state where the display unit 200 is opened, the antenna 210A is provided, for example, in a top portion of the display unit 200, and the antenna 210B is provided, for example, in a right or left side portion of the display unit 200. Additionally, the antenna 210A may be provided in a back side of the display unit 200, and the antenna 210B may be provided in a front side (the display-surface side of the liquid crystal panel 230) of the display unit 200. Of course, the antenna 210A may be provided in the front side of the display unit 200, and the antenna 210B may be provided in the back side of the display unit 200. One of the antennas 210A and 210B is a transmitting/receiving antenna which can perform transmission and reception (that is, radiate radio waves), and the other is a receiving antenna which performs only reception. Hereinafter, it is assumed that the antenna 210A is the receiving antenna, and the antenna 210B is the transmitting/receiving antenna which radiates radio waves.

On the other hand, the main body 300 includes wireless LAN controllers 310A and 310B which are connected to the antennas 210A and 210B, respectively, and serve as wireless modules. In addition, a feed cable 220A extends from the antenna 210A in a left side frame of the display unit 200, and is connected to the wireless LAN controller 310A via the hinge 120. Similarly, a feed cable 220B extends downward from the antenna 210B, and is connected to the wireless LAN controller 310B via the hinge 120. The wireless LAN controller 310A converts a reception signal received by the antenna 210A into data which can be processed within the tablet PC 100, and transmits the converted data to a system bus (e.g., PCI bus). The wireless LAN controller 310B converts a reception signal received by the antenna 210B into data which can be processed within the tablet PC, and transmits the converted data to the system bus. In addition, the wireless LAN controller 310B generates transmission data based on information received via the system bus, modulates the generated transmission data, and transmits the transmission data via the antenna 210B. For example, transmission data is generated based on information which is input by operating a tablet surface, and the transmission data is transmitted from the antenna 210B.

Figure 2A:
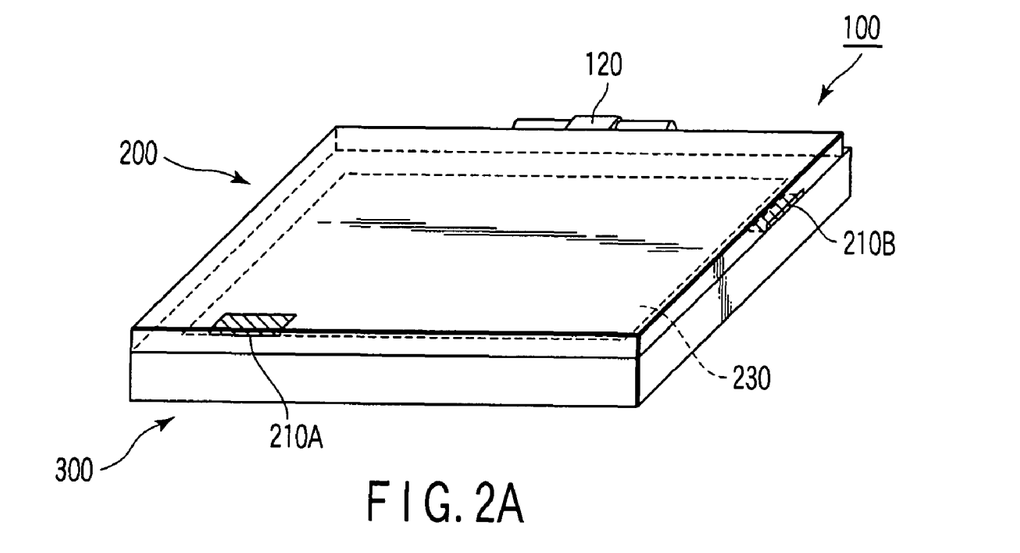
FIG. 2A is an exemplary diagram showing a state where a display unit of the information processing apparatus shown in FIG. 1 is closed to contact a main body with a display panel facing inward.
Figure 2B:
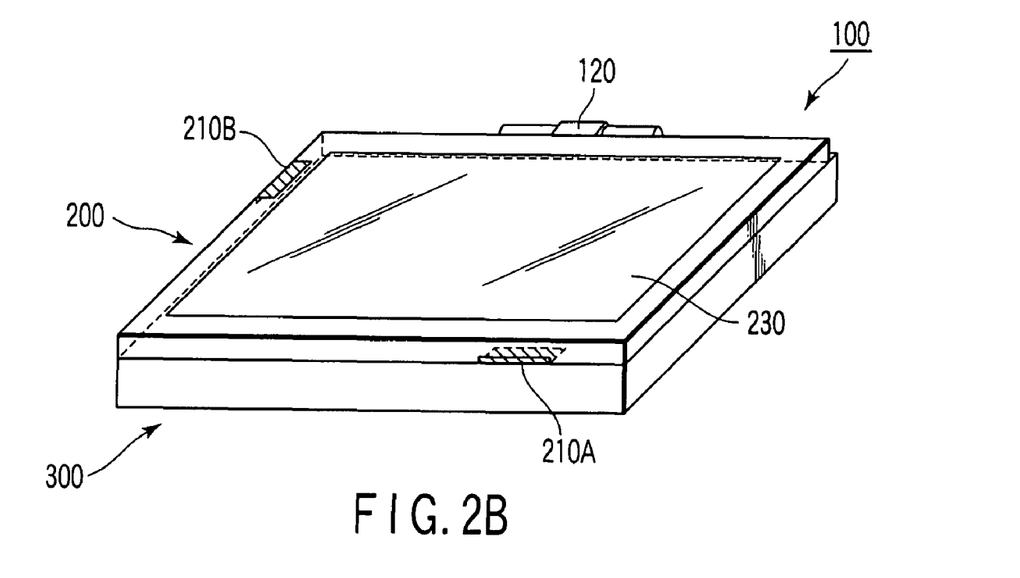
FIG. 2B is an exemplary diagram showing a state where the display unit of the information processing apparatus shown in FIG. 1 is closed to contact the main body with a display panel facing outward.

FIG. 2A shows a state where the tablet PC 100 is closed (folded) such that the display unit 200 contacts the main body 300 with the liquid crystal panel 230 facing inward. On the other hand, FIG. 2B shows a state where the tablet PC 100 is closed (folded) such that the display unit 200 contacts the main body 300 with the liquid crystal panel 230 facing the outside. That is, FIG. 2B shows a state (corresponding to a tablet usage pattern called "tablet mode") where a back surface of the display unit 200 faces a top surface of the main body 300. In FIGS. 2A and 2B, illustration of the feed cables 220A and 220B, the wireless LAN controllers 310A and 310B, etc. is omitted.

Figure 3A:
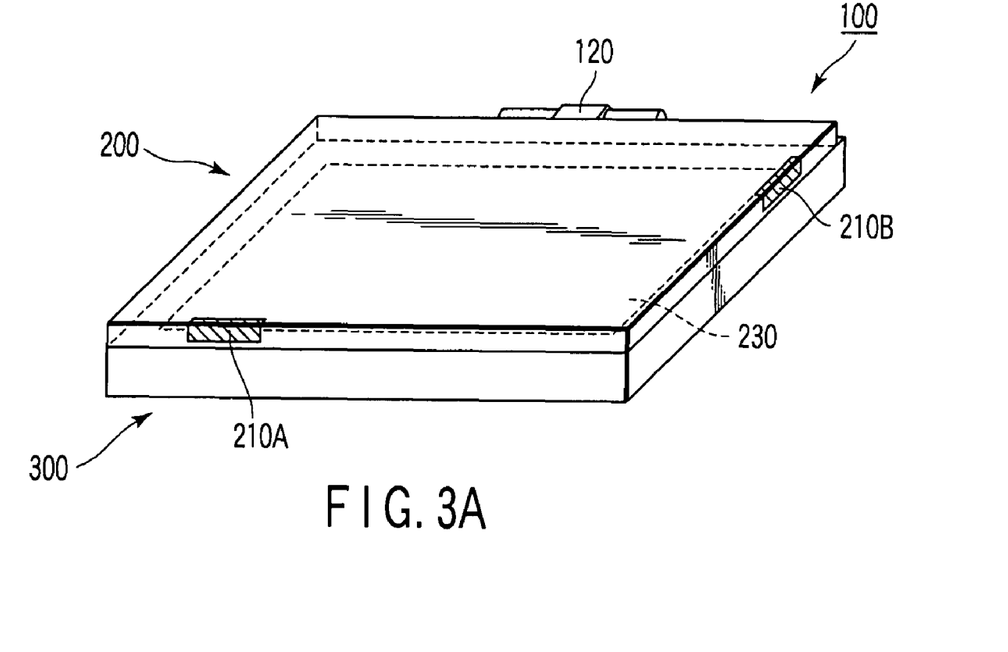
FIG. 3A is an exemplary diagram showing an arrangement of antennas different from an arrangement of the antennas shown in FIG. 1.
Figure 3B:
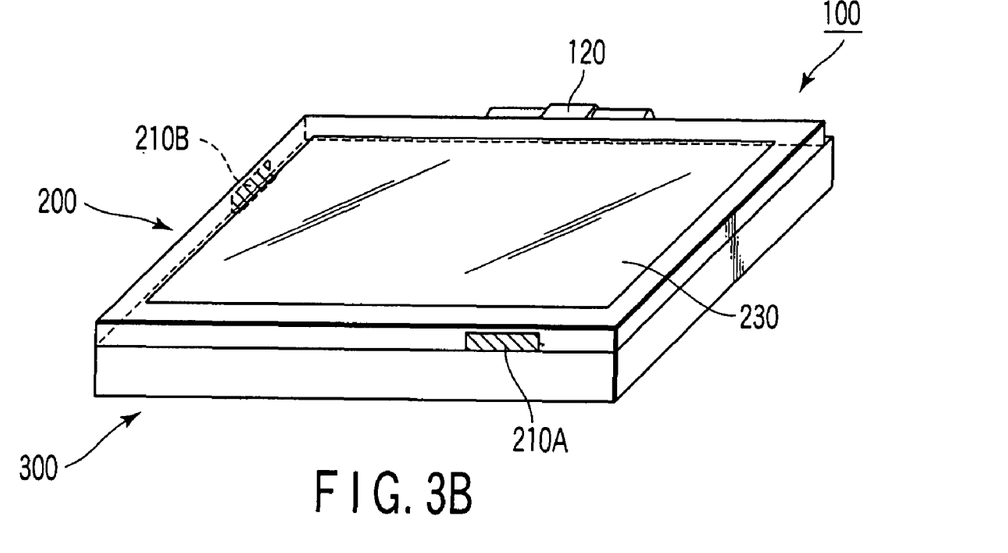
FIG. 3B is an exemplary diagram showing the arrangement of antennas different from the arrangement of the antennas shown in FIG. 1.

The exemplary arrangements of the antennas 210A and 210B shown in FIGS. 2A and 2B may be changed to, for example, the exemplary arrangements shown in FIGS. 3A and 3B. FIGS. 3A and 3B show an exemplary case where each of the antennas 210A and 210B is provided on the back-surface side of the display unit 200.

FIGS. 4A through 4D are exemplary diagrams for explaining usage patterns in the tablet mode. Additionally, FIGS. 5A and 5B are exemplary diagrams for explaining the difference between the usage patterns. The usage patterns are generally classified into "portrait" (vertical display) in which the tablet PC 100 is used with the shorter side of the display unit 200 being horizontal, and "landscape" (horizontal display) in which the tablet PC 100 is used with the longer side of the display unit 200 being horizontal.

As shown in FIGS. 4A through 4D, the tablet mode may include four kinds of usage patterns, i.e., "portrait A" (primary portrait), "portrait B" (secondary portrait), "landscape A" (primary landscape), and "landscape B" (secondary landscape). In each of FIGS. 4A through 4D, the direction in which a user sees the tablet surface when using the tablet PC 100 is indicated by arrows, and a side of the display unit 200 closest to the user's body (abdomen, chest, etc.) is indicated by X.

Figure 4A:
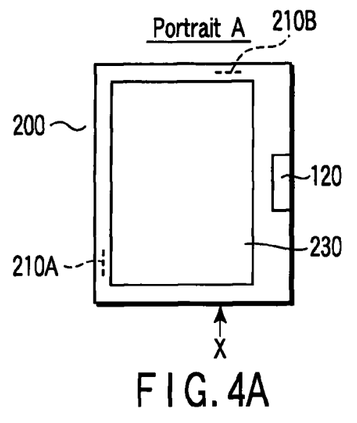
FIG. 4A is an exemplary diagram for explaining a usage pattern in a tablet mode according to the first embodiment.
Figure 4B:
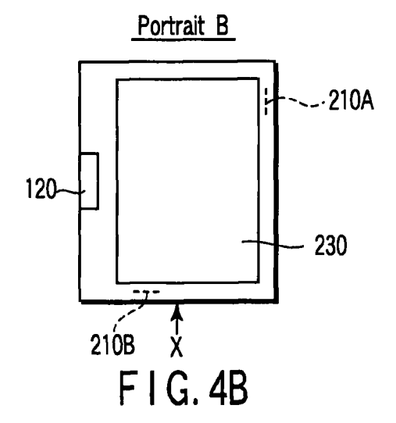
FIG. 4B is an exemplary diagram for explaining another usage pattern in the tablet mode according to the first embodiment.
Figure 5A:
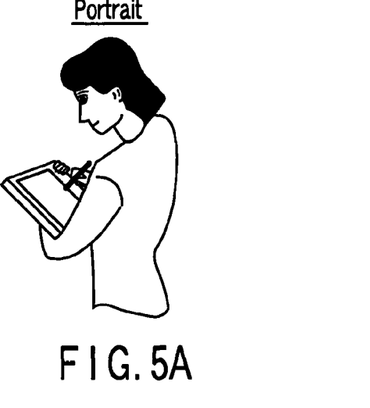
FIG. 5A is an exemplary diagram for explaining an exemplary usage of the information processing apparatus shown in FIG. 1 in the tablet mode.
Figure 5B:
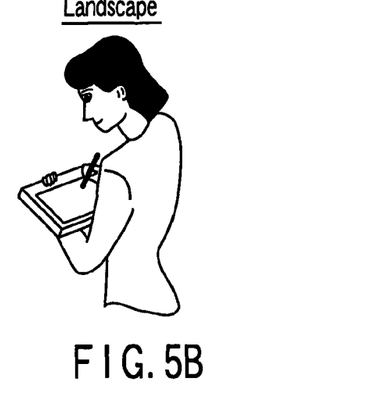
FIG. 5B is an exemplary diagram for explaining another exemplary usage of the information processing apparatus shown in FIG. 1 in the tablet mode.

In the usage pattern "portrait A" shown in FIG. 4A, the hinge 120 is located on the right side of the display unit 200. In the usage pattern "portrait B" shown in FIG. 4B, the hinge 120 is located on the left side of the display unit 200. FIG. 5A shows an exemplary state where the user uses the tablet PC 100 in the usage pattern "portrait A" or "portrait B".

Figure 4C:
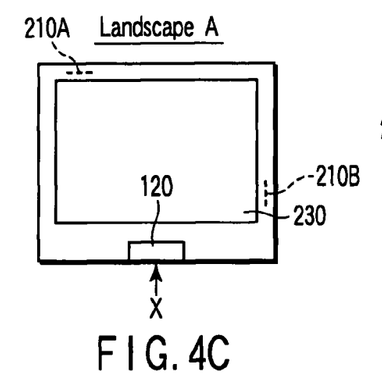
FIG. 4C is an exemplary diagram for explaining still another usage pattern in the tablet mode according to the first embodiment.

In the usage pattern "landscape A" shown in FIG. 4C, the hinge 120 is located on the lower side of the display unit 200. In the usage pattern "landscape B" shown in FIG. 4D, the hinge 120 is located on the upper side of the display unit 200. FIG. 5B shows an exemplary state where the user uses the tablet PC 100 in the usage pattern "landscape A" or "landscape B".

Figure 4D:
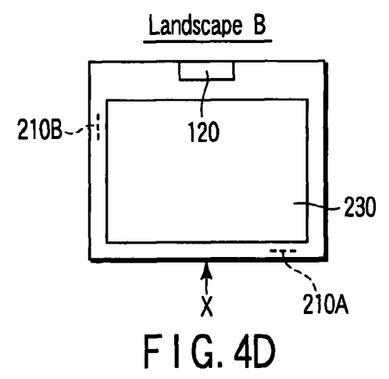
FIG. 4D is an exemplary diagram for explaining still another usage pattern in the tablet mode according to the first embodiment.

Additionally, in each of the usage patterns "portrait A", "landscape A" and "landscape B" shown in FIGS. 4A, 4C and 4D, respectively, the antenna 210B radiating radio waves is located at a position distant from the user's body. On the other hand, in the usage pattern "portrait B" shown in FIG. 4B, the antenna 210B radiating radio waves is located in a side of the display unit 200 which side is closest to the user's body (e.g., abdomen or chest).

The first embodiment of the invention provides a display control function which excludes "portrait B" shown in FIG. 4B in the tablet mode from usage patterns available to the user. In order to achieve the display control function, the first embodiment of the invention provides a control unit which, when the usage pattern "portrait B" is selected where the antenna 210B radiating radio waves is located in the side of the display unit 200 which side is closest to the user's body, controls an image displayed on the display portion 230 not to correspond to the selected usage pattern of the display unit 200. For example, when the user is using the tablet PC 100 in the tablet mode, and changes the usage pattern from "landscape A" shown in FIG. 4C to "portrait B" shown in FIG. 4B, characters/images displayed on the display portion 230 do not change from a state where the characters/images can be appropriately viewed in "landscape A" (i.e., a state where the characters/images can be appropriately viewed with the hinge 120 located on the bottom of the display unit 200). That is, the direction of the display image is not changed. In addition, when the user is using the tablet PC 100 in the tablet mode, and changes the usage pattern from "portrait A" shown in FIG. 4A to "landscape A" shown in FIG. 4C, characters/images displayed on the display portion 230 are changed from a sate which allows the characters/images to be appropriately viewed in "portrait A" (i.e., appropriately viewed with the hinge 120 located on the right side of the display unit 200) to a state which allows the characters/images to be appropriately viewed in "landscape A" (i.e., appropriately viewed with the hinge 120 located on the bottom of the display unit 200). That is, the direction of the display image is changed. Further, in the cases where the usage pattern is changed from "landscape A" to "landscape B", where the usage pattern is changed from "landscape B" to "portrait A", where the usage pattern is changed from "portrait A" to "landscape B", where the usage pattern is changed from "landscape B" to "landscape A", and where the usage pattern is changed from "landscape A" to "portrait A", the direction of the display image is changed in accordance with the usage pattern, so that the characters/images can be appropriately viewed in each of the cases.

Figure 6:
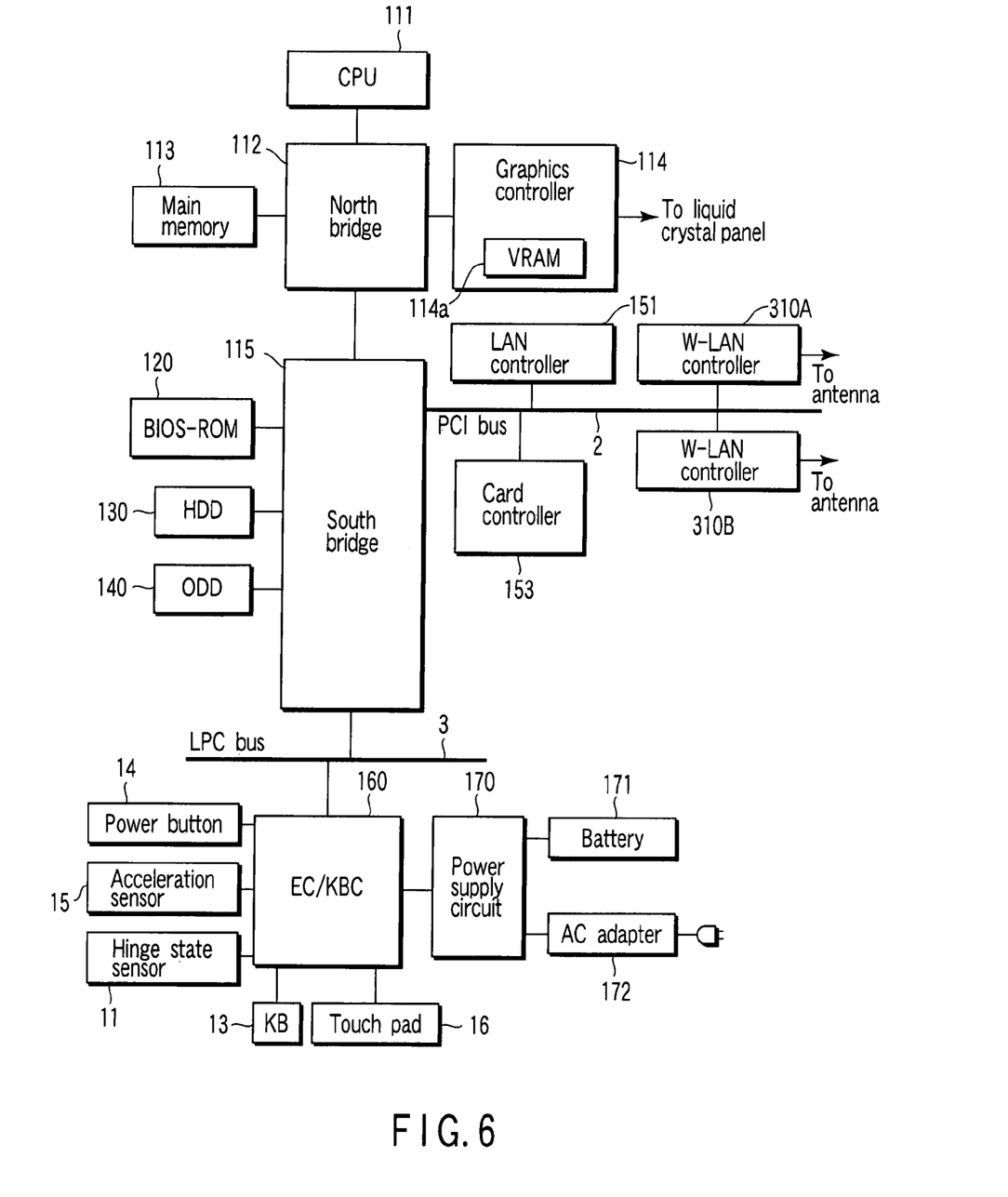
FIG. 6 is an exemplary block diagram showing an exemplary system configuration of the information processing apparatus shown in FIG. 1.

FIG. 6 shows an exemplary system structure of the tablet PC 100 including the display control function in accordance with the above-mentioned usage patterns.

The main body 300 of the tablet PC 100 includes a CPU 111, a north bridge 112, a main memory 113, a graphics controller 114, and a south bridge 115. The main body 300 also includes a BIOS-ROM 120, a hard disk drive (HDD) 130, an optical disk drive (ODD) 140, a LAN controller 151, wireless LAN (W-LAN) controllers 310A and 310B, a card controller 153, an embedded controller/keyboard controller IC (EC/KBC) 160, and a power supply circuit 170.

Figure 10:
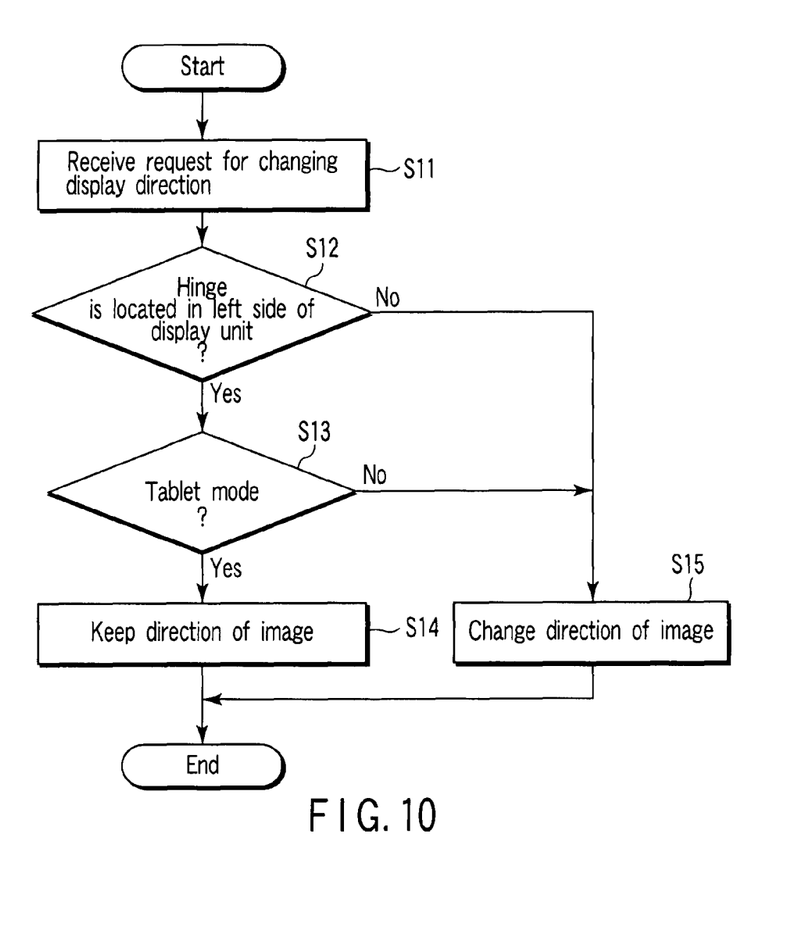
FIG. 10 is an exemplary flowchart for explaining a process according to the first embodiment of the invention.
Figure 11:
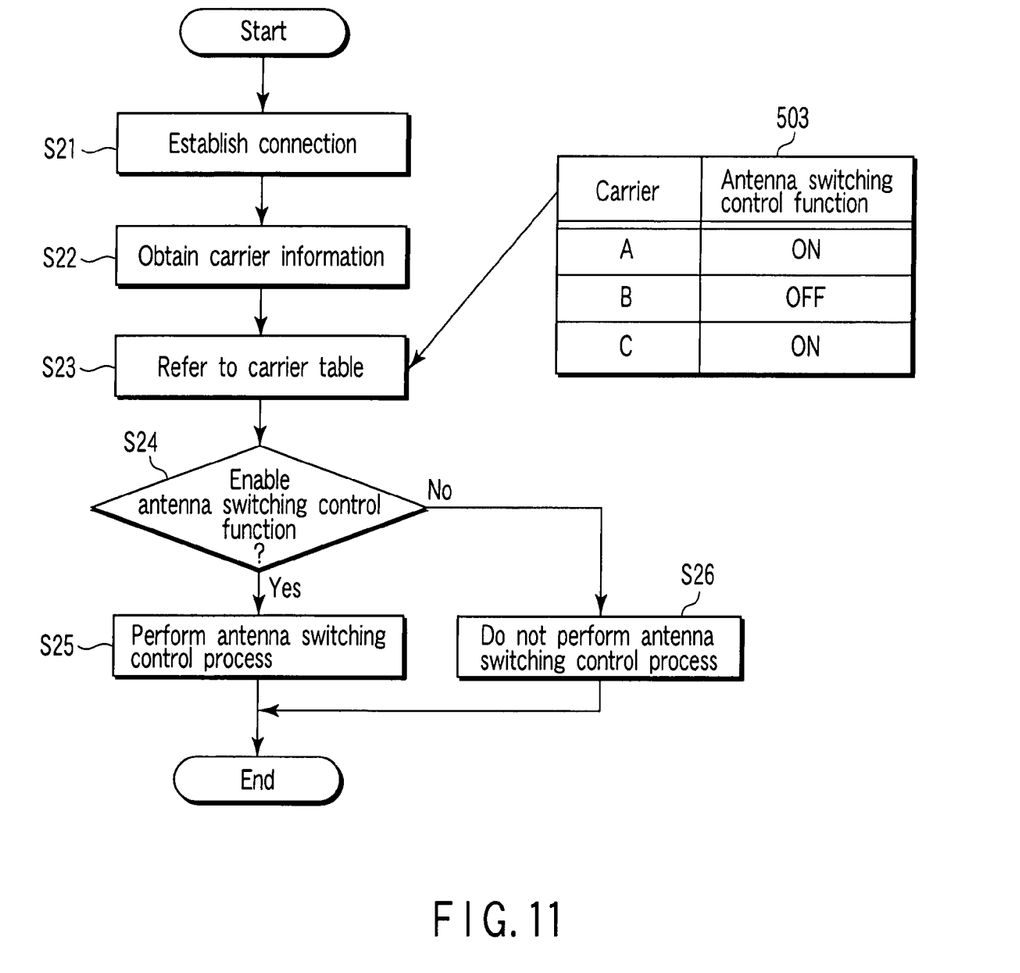
FIG. 11 is an exemplary flowchart for explaining a process according to a second embodiment of the invention.

The CPU 111 is a processor which controls an operation of the computer (tablet PC 100). The CPU 111 executes an operating system (OS) which is loaded from a boot device, such as the HDD 130, to the main memory 113. Additionally, the CPU 111 executes various application programs. Further, the CPU 111 executes a system BIOS (Basic Input Output System) stored in the BIOS-ROM 120. The system BIOS is a program which performs hardware control. FIG. 10 shows a display control process routine of a utility (program) executed by the CPU 111 according to the first embodiment. FIG. 11 shows a display control process routine of a utility according to the second embodiment. The display control process routine of each of the first and second embodiments will be described later.

The north bridge 112 is a bridge device which connects a local bus of the CPU 111 to the south bridge 115. The north bridge 112 incorporates therein a memory controller which controls access to the main memory 113. In addition, the north bridge 112 includes a function of performing communication with the graphics controller 114 via an AGP (Accelerated Graphics Port) bus.

The graphics controller 114 is a display controller which controls, for example, the liquid crystal panel 230. The graphics controller 114 includes a video memory (VRAM) 114a. The graphics controller 114 generates, from display data written in the VRAM 114a, an image signal for forming a display image to be displayed on the liquid crystal panel (display portion) 230.

The south bridge 115 controls access to the BIOS-ROM 120. The BIOS-ROM 120 is a rewritable non-volatile memory such as a flash EEPROM. As mentioned above, the BIOS-ROM 120 stores the system BIOS. In addition, the south bridge 115 controls disk drives (I/O devices) such as the HDD 130 and the ODD 140. Further, the south bridge 115 is connected to each of a PCI (Peripheral Component Interconnect) bus 2 and an LPC (Low Pin Count) bus 3. The south bridge 115 controls each device on the PCI bus 2 and the LPC bus 3. The PCI bus 2 is used as the system bus.

The HDD 130 is a storage device which stores various kinds of software and data. The HDD 130 writes data in and read data from a magnetic recording medium (magnetic disk) which is rotated by a motor. The operating system (OS) is stored in the HDD 130 in advance. The OS is loaded to the main memory 113 by the system BIOS stored in the BIOS-ROM 120, and is executed by the CPU 111.

The ODD 140 is a drive unit which drives an optical recording medium (optical disk), such as a compact disk (CD) and a digital versatile disk (DVD), by a motor. The ODD 140 reads data from and writes data in an optical disk by using a head (optical head).

The LAN controller 151, the wireless LAN controllers 310A and 310B, and the card controller 153 are connected to the PCI bus 2. The LAN controller 151 is a network controller for connecting the main body 300 to a LAN (wire LAN). The wireless LAN controllers 310A and 310B are network controllers for connecting the main body 300 to a wireless LAN. The card controller 153 controls a card device, such as a PC card or an SD (Secure Digital) card, which is inserted in a card slot connected to the card controller 153.

The EC/KBC 160 is a single chip microcomputer integrating thereon an embedded controller (EC) 400 for power supply management and a keyboard controller for controlling the keyboard (KB) 13 and a touchpad 16 forming the tablet surface. The EC/KBC 160 includes a power supply control function which powers on the computer (tablet PC) 10 in combination with the power supply circuit 170, in response to a user's operation of a power button switch 14. Additionally, the EC/KBC 160 can receive each detection signal sent from an acceleration sensor 15 and a hinge state sensor 11, and can inform the BIOS, the drivers, or the OS of information indicating various states as information for determining each of the usage modes (tablet mode/laptop mode) and each of the usage patterns shown in FIGS. 4A through 4D.

The accelerated sensor 15 detects acceleration externally gained with respect to three axial directions in a three-dimensional space. The hinge state sensor 11 detects the state of the hinge 120 (i.e., the state of the display unit 200 with respect to the main body 300). The detection signal of each of these sensors is supplied to the BIOS, the driver or the OS via the EC/KBC 160 as information for determining each of the usage modes (tablet mode/laptop mode) and each of the usage patterns shown in FIGS. 4A through 4D. In this embodiment, each of the usage patterns shown in FIGS. 4A through 4D is determined by the hinge state sensor 11 and the acceleration sensor 15. However, other methods can be used. For example, it is possible to use a method of providing the display unit 200 with an operation button for giving an instruction to change the usage pattern, and when the operation button is pressed down for a predetermined time period, recognizing the usage pattern based on the detection signal of the acceleration sensor 15. In this method, an operation signal of the operation button triggers the recognition of the usage pattern. Additionally, it is possible to use a method of specifying the usage pattern by a selection operation by the user. When any one of these methods is used, it is possible to realize the control function which, when the usage pattern is changed to "portrait B" where the antenna 210B radiating radio waves is located in the side of the display unit 200 which side is closest to the user's body, controls the direction of an image displayed on the display portion 230 not to correspond to the direction of the display unit 200.

The power supply circuit 170 generates a system power supply voltage to be applied to each element of the main body 300 by using a DC current which is supplied via a rechargeable battery 171 or an AC adapter 172 serving as a high voltage power supply. The AC adapter 172 converts AC power to DC power.

Figure 7:
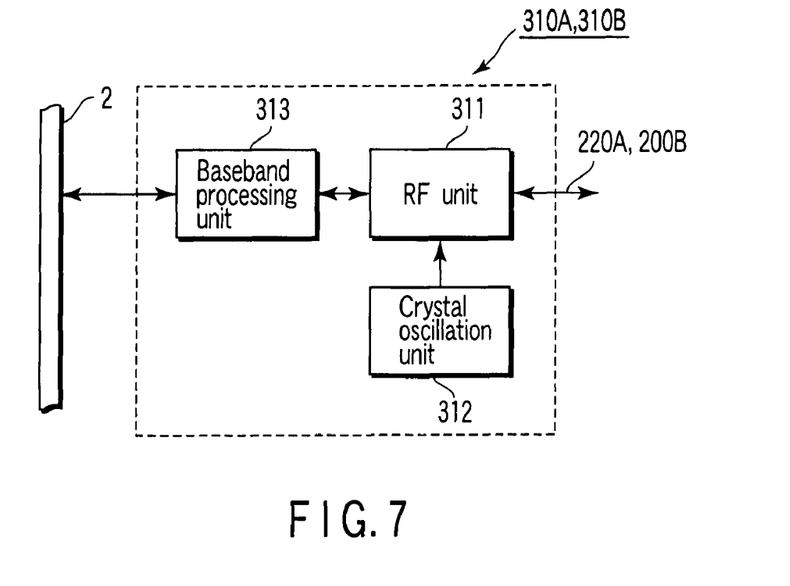
FIG. 7 is an exemplary block diagram showing an exemplary configuration of a wireless LAN controller used in the information processing apparatus shown in FIG. 1.

FIG. 7 shows an exemplary configuration of each of the wireless LAN controllers 310A and 310B which are connected to the antennas 210A and 210B, respectively. Here, a description is given only of the wireless controller 310B.

The wireless LAN controller 310B includes an RF (Radio Frequency) unit 311, a crystal oscillation unit 312, and a baseband processing unit 313.

The RF unit 311 converts a high frequency signal which is input from the antenna 210B via the feed cable 220B to a low frequency signal based on an oscillating frequency of the crystal oscillation unit 312, and outputs the low frequency signal to the baseband processing unit 313. In addition, the RF unit 311 converts (modulates) a baseband signal which is output from the baseband processing unit 313 to a high frequency signal based on the oscillation frequency from the crystal oscillation unit 312, and outputs the high frequency signal to the antenna 210B via the feed cable 220B.

The baseband processing unit 313 performs analog-to-digital conversion on the baseband signal which is output from the RF unit 311, thereby converting the baseband signal to a digital signal which can be processed by the CPU 111. The baseband processing unit 313 outputs the digital signal to the PCI bus 2. Additionally, the baseband processing unit 313 performs digital-to-analog conversion on a digital signal which is input from the PCI bus 2, thereby converting the digital signal to an analog signal in a base band. The baseband processing unit 313 outputs the analog signal to the RF unit 311. In this embodiment, the wireless LAN controllers 310A and 310B are provided on the PCI bus 2 as wireless controllers which are connected to the antennas 210A and 210B, respectively. However, the wireless controllers may be provided on a general-purpose bus such as a USB bus (not shown) which is connected to the south bridge 115.

Figure 8:
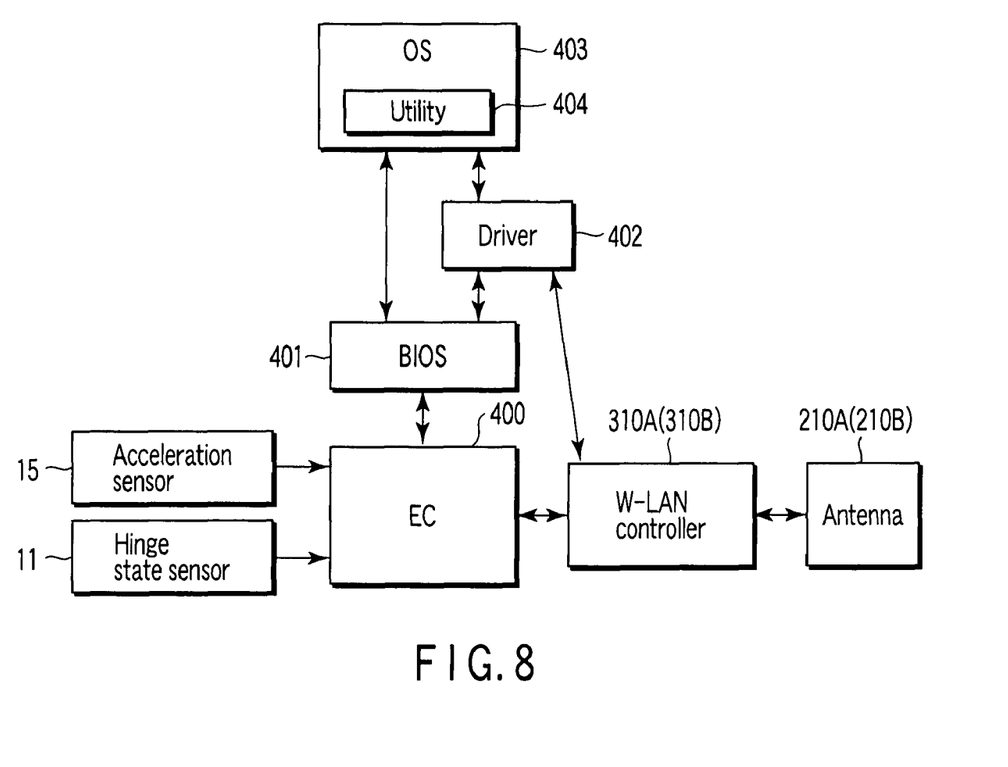
FIG. 8 is an exemplary block diagram showing functional elements of the information processing apparatus shown in FIG. 1.

FIG. 8 shows functional elements in the system configuration shown in FIG. 6 for realizing the control function of controlling the direction of an image displayed on the display portion 230 not to correspond to the direction of the display unit 200, when the usage pattern is changed to "portrait B" where the antenna 210B irradiating radio waves is located in the side of the display unit 200 which side is closest to the user's body.

As shown in FIG. 8, the EC 400 can transmit, to the OS 403 via the BIOS 401, acceleration information obtained from the acceleration sensor 15 and hinge state information transmitted from the hinge state sensor 11. It is also possible to adopt a configuration in which the acceleration information and the hinge state information are provided to the OS 403 without using the EC 400.

The BIOS 401 can obtain, for example, the acceleration information and the hinge state information, and inform the OS 40 of these kinds of information. The driver 402 controls the wireless LAN controllers 310A and 310B under control by the OS 403.

The OS 403 can recognize each of the usage modes (tablet mode/laptop mode) of the tablet PC 100 and each of the usage patterns in the tablet mode shown in FIGS. 4A through 4D based on the acceleration information and the hinge state information obtained from the BIOS 401, and can recognize the direction of a current display image based on the information related to display and stored in the OS 403. Additionally, the OS 403 can recognize the usage mode and usage pattern of the tablet PC 100 based on the obtained acceleration information and hinge state information, and can appropriately switch the direction of an image displayed on the display portion 230 in accordance with the recognized usage mode and usage pattern. Further, the OS 403 can obtain carrier information (information of carriers to be accessed, etc.) via a predetermined communication module (3G module, etc.). Such information is sent to a utility 404 and used for controlling display (the direction of a display image) in accordance with the usage pattern.

Figure 9:
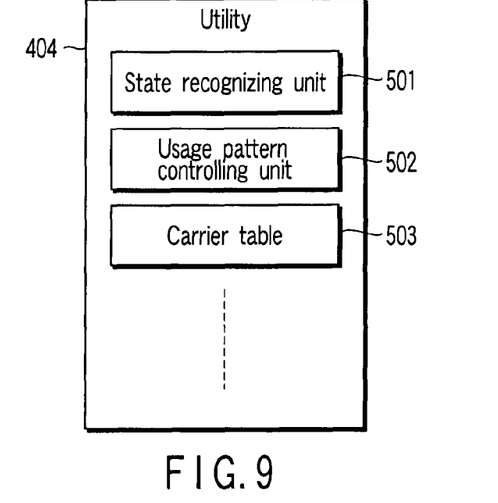
FIG. 9 is an exemplary diagram showing an exemplary function/configuration of a utility used in the information processing apparatus shown in FIG. 1.

As shown in FIG. 9, the utility 404 includes a state recognizing unit 501, a usage pattern controlling unit 502, and a carrier table 503 including information of carriers to be accessed. It is not always necessary to provide the state recognizing unit 501, the usage pattern controlling unit 502, and the carrier table 503 in the utility 404. A part of the state recognizing unit 501, the usage pattern controlling unit 502, and the carrier table 503 may be realized by another software or hardware.

The state recognizing unit 501 recognizes, for example, each of the usage modes (tablet mode/laptop mode) and each of the usage patterns shown in FIGS. 4A through 4D of the tablet PC 100, based on the information of the direction of a display image obtained from the OS 403, and the acceleration information and the hinge state information which are obtained from the BIOS 401 (or the OS 403). When the tablet PC 100 is used in the tablet mode, the state recognizing unit 501 recognizes each of the usage patterns "portrait A", "portrait B", "landscape A" and "landscape B" shown in FIGS. 4A, 4B, 4C and 4D, respectively.

The usage pattern controlling unit 502 controls the direction of an image displayed on the display portion 230 based on the usage pattern recognized by the state recognizing unit 501. For example, when the tablet PC 100 is used in the tablet mode, and the usage pattern is changed to "portrait B" where the antenna 210B radiating radio waves is located in the side of the display unit 200 which side is closest to the user's body, the usage pattern controlling unit 502 keeps the direction of the image displayed on the display portion 230 so that the display direction does not correspond to the changed direction of the display unit 200.

The provider table 503 includes information indicating whether display control in accordance with the above-mentioned usage patterns in the tablet mode is enabled or disabled for each of the carriers providing wireless environments used by the tablet PC 100. A process using the carrier table 503 will be described later with reference to FIG. 11.

FIG. 10 shows an exemplary process of the state recognizing unit 501 and the usage pattern controlling unit 502 which are provided in the utility 404.

Referring to FIG. 10, a description is given of a display controlling process in accordance with the usage patterns in the tablet mode according to the first embodiment of the invention.

Under control by the OS 403, the state recognizing unit 501 recognizes the usage pattern of the tablet PC 100 based on the acceleration information, the hinge state information, and the information of the direction of a display image obtained from the OS 403 (S11 through S13). Here, in the case where a change is detected in the direction of the display unit 200 when the tablet PC 100 is used (or in the case where the user issues a request for changing the display direction by, for example, operating the operation button, and the request is received)(S11), the state recognizing unit 501 determines whether or not the tablet PC 100 is used in the usage pattern where the hinge 120 is located in the left side of the display unit 200 when seen from the user (S12). When it is determined that the tablet PC 100 is used in the usage pattern where the hinge 120 is located in the left side of the display unit 200 (YES in S12), it is determined whether the tablet PC 100 is used in the tablet mode or the laptop mode (S13). Information of each of these determination results is provided to the usage pattern controlling unit 502.

Based on the information of the determination results received from the state recognizing unit 501, when the usage pattern controlling unit 502 recognizes that the usage pattern of the tablet PC 100 is changed to the usage pattern "portrait B" in the tablet mode (YES in S13), the usage pattern controlling unit 502 keeps the direction of an image displayed on the display portion 230 so that the display direction does not correspond to the changed direction of the display unit 200 (S14). For example, when the user is using the tablet PC 100 in the tablet mode, and changes the usage pattern of the tablet PC 100 from "landscape A" shown in FIG. 4C to "portrait B" shown in FIG. 4B, characters/images displayed on the display portion 230 are not changed from a state where the characters/images can be appropriately viewed in "landscape A" (i.e., a state where the characters/images can be appropriately viewed with the hinge 120 located on the bottom of the display unit 200). That is, the direction of the display image is not changed. Accordingly, it is impossible to perform a normal input/output operation when the tablet PC 100 is used in the tablet mode and the usage pattern is "portrait B".

Additionally, when the user is using the tablet PC 100 in the tablet mode, and changes the usage pattern from, for example, "portrait A" shown in FIG. 4A to "landscape A" shown in FIG. 4C (NO in S13), the direction of the characters/images displayed on the display portion 230 are changed from a state where the characters/images can be appropriately viewed in "portrait A" (i.e., a state where the characters/images can be appropriately viewed with the hinge 120 located in the right side of the display unit 200) to a state where the characters/images can be appropriately viewed in "landscape A" (i.e., a state where the characters/images can be appropriately viewed with the hinge 120 located in the lower side of the display unit 200) (S15). Further, when the tablet PC 100 is used in the tablet mode and changed to one of the usage patterns other than "portrait B" (i.e., "portrait A", "landscape A" or "landscape B") (NO in S12), and when the tablet PC 100 is used in the laptop mode (NO in S13), similarly, the direction of the image displayed on the display portion 230 is changed in accordance with the changed direction of the display unit 200 (S15).

With the display control process in accordance with the usage pattern as mentioned above, it is possible to provide a tablet PC which satisfies standards established in the Japanese law related to radio waves.

FIG. 11 shows a display control process in accordance with the usage pattern according to a second embodiment of the invention. The second embodiment further provides a function of enabling/disabling the above-mentioned display control function according to the first embodiment, in accordance with a carrier which provides a wireless environment used by the tablet PC 100.

Every time the wireless LAN controller 310B is connected to a communication line (S21), the usage pattern controlling unit 502 obtains carrier information (S22). Based on the carrier information, the usage pattern controlling unit 502 refers to the carrier table 503 (S23), and determines whether to enable or disable the display control function in accordance with the usage pattern shown in FIG. 10 (S24). Here, a carrier to be accessed is, for example, a carrier A which requires the display control function in accordance with the usage pattern shown in FIG. 10, every time the direction of the display unit 200 is changed, the display control process shown in FIG. 10 is performed (i.e., the display control process is enabled) (S25). In addition, when the carrier to be accessed is, for example, a provider B which does not require the display control function in accordance with the usage pattern shown in FIG. 10, the display control process shown in FIG. 10 is not performed (i.e., the display control process is disabled) (S26).

As mentioned above, by providing the display control function in accordance with the usage pattern to a tablet PC which performs wireless communication, it is possible to perform an input/output operation in each of various kinds of usage patterns in consideration of SAR (Specific Absorption Rate), etc.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. For example, in each of the above-mentioned embodiments, the function of the invention is realized in the tablet PC 100 in which the display unit 200 is rotatably attached to the main body 300. However, the invention may be realized in other devices. For example, the invention can also be realized in a tablet input device having a single housing. Additionally, in the above-mentioned embodiments, the wireless LAN antennas 210A and 210B are provided inside the two adjacent sides of the display unit 200. However, it is possible to adopt a configuration in which at least one transmission/reception antenna is provided in the display unit 200. In addition, the four kinds of usage patterns are described as the usage patterns in the tablet mode. However, the usage patterns in the tablet mode are not limited to the above-mentioned four kinds of usage patterns. The invention may be applied to an apparatus which allows at least two or more kinds of usage patterns. Further, the unit for determining the usage mode and the usage pattern is not limited to the above-mentioned state recognizing unit 501. It is also possible to use another detecting mechanism, or a method of specifying the usage pattern by a user's operation and another determination method. The configuration of the wireless modules is not limited to the configuration described in the above-mentioned embodiments. The wireless modules may be wireless modules including a communication function other than the wireless LAN communication function. In short, in an apparatus which includes an antenna radiating radio waves and can be used in a state where the antenna is located close to a human body, the apparatus should be configured to realize, without condition or under a specific condition, a function of switching from one usage pattern to another usage pattern, except for a usage pattern in which the antenna is located close to the human's body. The accompanying claims and their equivalents are intended to cover such forms or modifications as would fall within the scope and spirit of the inventions.

What is claimed is:

1. An information processing apparatus, comprising:
a display unit configured to display an image;
a transmitting antenna provided in the display unit and radiating radio waves; and
a controlling unit which includes a function of changing an orientation of the image displayed by the display unit in accordance with an orientation of the display unit when the orientation of the display unit is changed, wherein the orientation of the image displayed by the display unit is not changed when the orientation of the display unit is changed to a state where the transmitting antenna is located in a side of the display unit which is closest to a user.

2. The information processing apparatus according to claim 1, wherein the display unit includes a tablet surface.

3. The information processing apparatus according to claim 2, further comprising:
an acceleration sensor which detects an acceleration of the display unit and outputs a detection signal; and wherein the controlling unit is configured to change the orientation of the image displayed on the display unit based on the detection signal which is output from the acceleration sensor.

4. The information processing apparatus according to claim 2, further comprising:
a wireless communication unit configured to generate transmission data based on information which is input by operating the tablet surface and transmit the transmission data via the transmitting antenna.

5. The information processing apparatus according to claim 2, wherein the controlling unit enables and disables the function in accordance with information of a carrier with which the information processing apparatus communicates via the transmitting antenna.

6. An information processing apparatus, comprising:
a main body;
a display unit rotatably attached to the main body via a hinge;
a display portion provided in a front surface of the display unit;
a transmitting antenna provided in the display unit and radiating radio waves; and
a controlling unit which includes a function of changing an orientation of the image displayed at the display portion in accordance with an orientation of the display unit when the orientation of the display unit is changed, wherein the orientation of the image displayed at the display portion is not changed when a back surface opposing to the front surface of the display unit faces an upper surface of the main body and when the orientation of the display unit is changed to a state where the transmitting antenna is located in a side of the display unit which is closest to a user.

7. The information processing apparatus according to claim 6, wherein the main body includes a keyboard in the upper surface, and the display unit includes a tablet surface in the display portion.

8. The information processing apparatus according to claim 7, further comprising:
an acceleration sensor which detects an acceleration of the display unit and outputs a detection signal; and wherein the controlling unit is configured to change the orientation of the image displayed at the display portion based on the detection signal which is output from the acceleration sensor.

9. The information processing apparatus according to claim 7, wherein the controlling unit enables and disables the function in accordance with information of a carrier with which the information processing apparatus communicates via the transmitting antenna.

10. An operation control method to be applied to an information processing apparatus including a display unit configured to display an image and a transmitting antenna radiating radio waves, the operation control method comprising:
changing an orientation of the image displayed by the display unit in accordance with an orientation of the display unit when the orientation of the display unit is changed, wherein the orientation of the image displayed by the display unit is not changed when the orientation of the display unit is changed to a state where the transmitting antenna is located in a side of the display unit which is closest to a user.

11. The operation control method according to claim 10, wherein the display unit is rotatably attached to a main body via a hinge, and the display unit is folded to contact the main body such that a display surface of the display unit is exposed.

12. The operation control method according to claim 10, further comprising:
enabling and disabling the changing of the orientation of the image displayed in accordance with information of a carrier with which the information processing apparatus communicates via the transmitting antenna.

* * * * *